March 17, 1931. R. J. BRITTAIN, JR 1,797,043

JOURNAL BOX AND CAR FRAME CONSTRUCTION

Filed Oct. 12, 1929

INVENTOR:
RICHARD J. BRITTAIN JR.
BY
HIS ATTORNEY.

Patented Mar. 17, 1931

1,797,043

UNITED STATES PATENT OFFICE

RICHARD J. BRITTAIN, JR., OF BLOOMFIELD, NEW JERSEY, ASSIGNOR TO GENERAL MOTORS CORPORATION, OF DETROIT, MICHIGAN, A CORPORATION OF DELAWARE

JOURNAL-BOX AND CAR-FRAME CONSTRUCTION

Application filed October 12, 1929. Serial No. 399,353.

This invention relates to journal box and car frame construction and comprises all the features of novelty herein disclosed. An object of the invention is to provide an improved device for mounting a frame on a journal box in a manner to allow free oscillation around horizontal and vertical axes. Another object is to provide an improved oscillating driving connection between journal box and frame. To these ends and to improve generally and in detail upon devices of this character, the invention also consists in the various matters hereinafter described and claimed.

In its broader aspects, the invention is not necessarily limited to the specific construction selected for illustration in the accompanying drawings in which Fig. 1 is a side elevation partly in section.

Figures 1, 2:
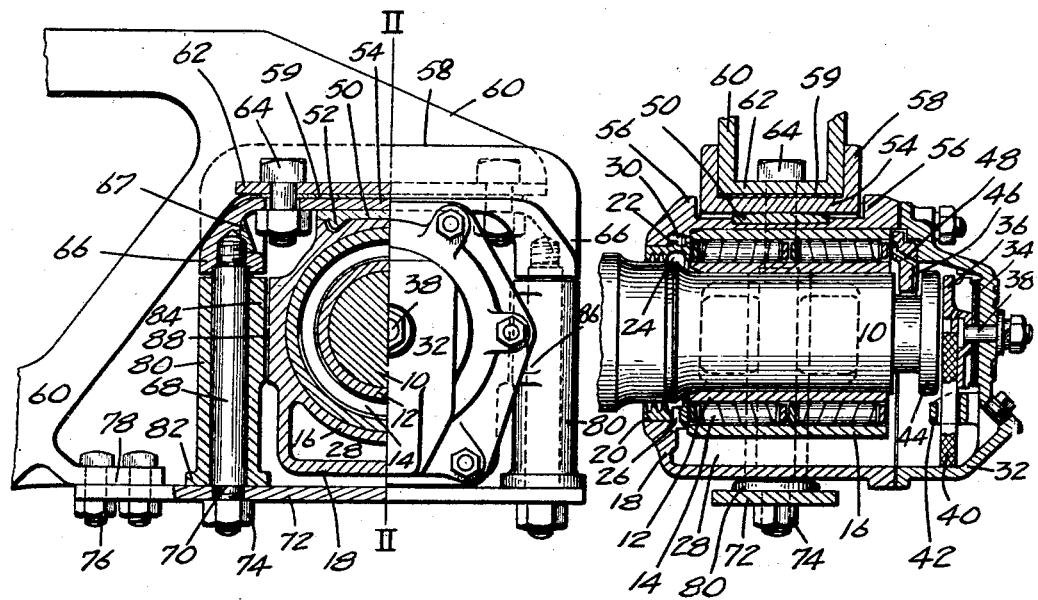
Fig. 2 is a section on line II—II of Fig. 1.
Figures 3, 4:
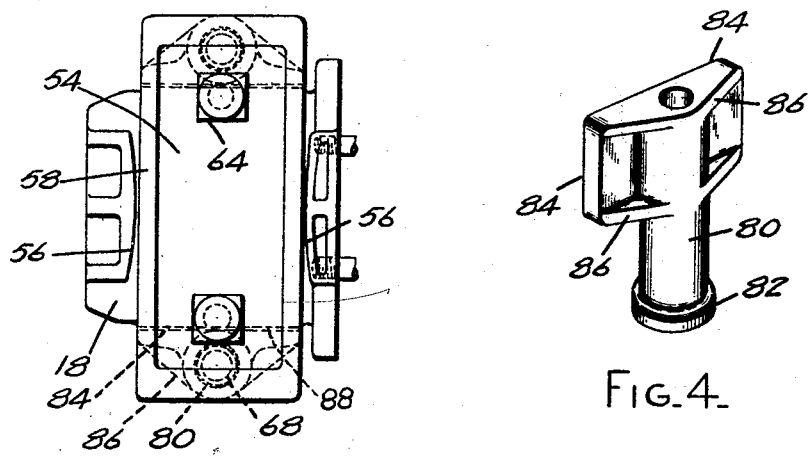
Fig. 3 is a plan view with the side frame omitted.
Fig. 4 is a perspective view of a detail.

The numeral 10 indicates a shaft or axle carrying a raceway sleeve 12 for roller bearings 14 which run in an outer sleeve 16 in the bore of an axle box 18. One end of the box has a bushing or cap 20 provided with a locating collar 22 and with grease grooves at the shaft. The cap 20 has a wide groove 24 which collects oil thrown off from a rib on the shaft and drains it through a notch 26 into a cored out lubricant reservoir 28 at the bottom of the box. The cap 20 is provided on its periphery with a relief groove 30 communicating with the bearings so that oil propelled by the bearings will drain around the groove into the reservoir thereby preventing the building up of an oil pressure tending to cause leakage at the shaft. The inner end of the cap is arranged to guide the adjacent cage for the roller bearings 14.

The outer end of the box has bolted thereto an end cap 32 carrying spacing plates 34 and a thrust block 36 which is clamped against the spacing plates and end cap by a square headed bolt 38. To lubricate the end of the axle a lubricating wick 40 is set in a recess of the thrust block and extends down into the bottom of the end cap which communicates with the lubricant reservoir 28 and supplements the latter, the wick passing through an opening in a holding lug 42 on the end cap.

The end of the axle has a collar 44 outside a groove which loosely receives an arcuate thrust plate 46 held by the end cap and guiding the adjacent cage of the roller bearings 14. The plate 46 has an inclined oil duct 48 communicating with ducts in the opposite walls of the plate, thus receiving oil from the bearings and conducting it to the inner wall of the collar 44. The plate 46 takes thrust of the axle in one direction and the thrust block 36 takes thrust in the other direction and all such thrust surfaces are lubricated.

The top of the box has a cross recess receiving a plate 50 which has holding lugs 52 extending down into cavities in the box. The top of the plate is crowned longitudinally of the axle and box and directly supports a saddle or adapter 54 which extends across the box between crowned lugs 56. The adapter and box can thus have relative rocking movement around a horizontal axis extending crosswise of the axle and there can also be a relative turning or twisting movement around a vertical axis extending crosswise of the axle. The crowned lugs 56 position the box with respect to the adapter and frame and absorb lateral pressure from thrusts. The adapter has side flanges 58 forming a recess receiving cushioning material 59 supporting a side frame 60 having a cross web 62 secured to the adapter by clamping bolts 64, the nuts for the bolts occupying cut out portions at the upper corners of the journal box. The adapter has short downwardly extending legs 66 embracing the top of the box. Thus, the adapter comprises a cross-piece extending across the box, side flanges embracing the side frame, and end legs at the sides of the box. Studs 68, having their upper ends reduced and threaded, are secured rigidly to the legs 66 of the adapter as by welding at 67. The threaded lower ends of the studs are reduced in size to form shoulders 70 against which a tie-bar 72 is rigidly clamped by nuts 74. The tie-bar passes under and clears the journal box and is secured by bolts 76 to a lug 78 on the side frame 60. The studs 68 pass through swivelled driving sleeves 80 which are free to swivel on the studs while their flanged lower ends 82 rest on the tie-bar. The driving sleeves have their upper portions provided with lateral extensions or driving plates 84 braced by webs 86. The driving plates 84 are at the level of the journal and present flat driving surfaces to flat driving surfaces 88 on the sides of the journal box. Thus the driving forces are transmitted in line with the journal and do not tend to tilt the box. As the journal box oscillates in a horizontal plane, the driving sleeves 80 oscillate to conform to it and thereby eliminate cramping on the journal box driving surfaces, as at curves in the track.

I claim:

1. A device for connecting a frame to a journal box and comprising a cross-piece to extend across the box, legs to extend down at the sides of the box, side flanges on the cross-piece to embrace the frame, and studs rigidly secured to the lower ends of the legs in a position to embrace the box and transmit driving forces thereto; substantially as described.

2. A device for connecting a frame to a journal box and comprising a cross-piece to extend across the box, legs to extend down at the sides of the box, side flanges on the cross-piece to embrace the frame, studs rigidly secured to the legs, and driving plates swivelled on the studs; substantially as described.

3. A device for connecting a frame to a journal box and comprising a cross-piece to extend across the box, legs to extend down at the sides of the box, studs rigidly secured to the legs, and driving plates swivelled on the studs; substantially as described.

4. A device for connecting a frame to a journal box and comprising a cross-piece to extend across the box, studs to extend down the sides of the box, and driving plates swivelled on the studs; substantially as described.

5. A device for connecting a frame to a journal box and comprising a cross-piece to extend across the box, downwardly extending members carried by the cross-piece, and driving plates swivelled on the members and arranged to engage the sides of the box; substantially as described.

6. A device for connecting a frame to a journal box and comprising a cross-piece to extend across the box, means between the box and the lower surface of the cross piece to provide for relative rocking of said members, side flanges on the cross-piece to embrace the frame, and cushioning material between the upper surface of the cross piece and the frame and confined between the side flanges of the cross piece; substantially as described.

7. A device for connecting a frame to a journal box and comprising a cross-piece to extend across the box, side flanges on the cross-piece to embrace the frame, and a plate to rest on the box and support the cross-piece, the plate and cross-piece being relatively crowned longitudinally of the box; substantially as described.

8. A device for connecting a frame to a journal box and comprising an adapter to extend across the box, side flanges on the adapter to embrace the frame, and driving members swivelled to the adapter and arranged to engage the sides of the box; substantially as described.

9. A device for connecting a frame to a journal box and comprising a cross-piece to extend across the box, studs to extend down the sides of the box, driving plates swivelled on the studs and arranged to engage the sides of the box, and a tie bar rigidly connecting the studs; substantially as described.

10. A device for connecting a frame to a journal box and comprising a cross-piece to extend across the box, studs to extend down the sides of the box, driving plates swivelled on the studs and arranged to engage the sides of the box, and a tie bar for connecting the frame to at least one of the studs; substantially as described.

11. A device for connecting a frame to a journal box and comprising a cross-piece to extend across the box, studs to extend down the sides of the box, driving plates swivelled on the studs and arranged to engage the sides of the box, and means for securing the cross-piece to the frame; substantially as described.

12. A device for connecting a frame to a journal box and comprising a cross-piece to extend across the box, studs to extend down the sides of the box, driving plates swivelled on the studs and arranged to engage the sides of the box, a tie bar connecting the ends of the studs, and means for securing the cross-piece to the frame; substantially as described.

13. In a device of the character described, a journal box, a frame supported by the box, studs carried by the frame at opposite sides of the box, and driving members swivelled on the studs and arranged to engage the sides of the box; substantially as described.

14. In a device of the character described, a journal box, a frame supported by the box, studs carried by the frame at opposite sides of the box, and sleeves swivelled on the studs and having lateral extensions, the extensions having driving surfaces to engage the sides of the box; substantially as described.

15. In a device of the character described, a journal box, a frame supported by the box, studs carried by the frame at opposite sides of the box, driving members swivelled on the studs and having lateral extensions at the level of the journal, and the box having flat driving surfaces for engagement with the lateral extensions; substantially as described.

16. In a device of the character described, a journal box, a frame supported by the box, the frame and box having relatively crowned surfaces for relative swinging around a vertical axis, and driving members swivelled with respect to the frame and arranged to engage the sides of the box; substantially as described.

17. In a device of the character described, a journal box, a frame supported by the box, the box having cross lugs confining the frame laterally and crowned crosswise to provide for relative swinging around a vertical axis, and driving members swivelled with respect to the frame to engage the sides of the box; substantially as described.

18. In a device of the character described, a journal box, a frame, an adapter between the box and frame, the adapter having legs at the sides of the box and side flanges embracing the frame, driving plates swivelled on the legs to engage the sides of the box, and fastening devices for securing the adapter to the frame and entering recesses in the box between the legs of the adapter; substantially as described.

19. In a device of the character described, a journal box, a frame, means between the frame and the box to provide for a relative rocking movement around a horizontal axis extending crosswise of the box, and driving plates at the sides of the box and having a swivelled mounting for providing for a relative twisting movement between box and frame around a vertical axis; substantially as described.

In testimony whereof I hereunto affix my signature.

RICHARD J. BRITTAIN, Jr.